S. B. WILLIAMS, Jr.
TELEPHONE EXCHANGE SYSTEM.
APPLICATION FILED SEPT. 23, 1915.
1,203,671.
Patented Nov. 7, 1916.
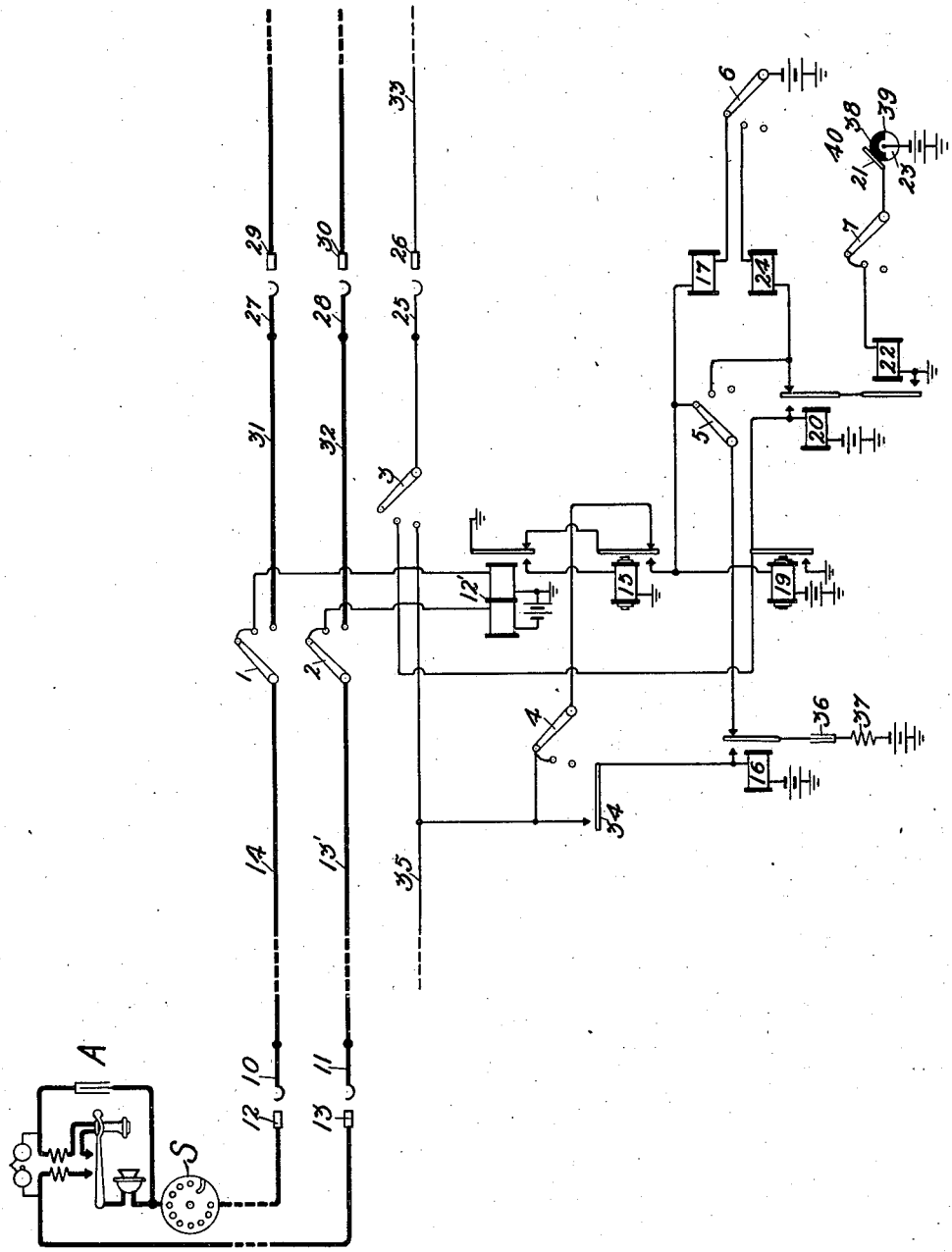
Inventor:
Samuel B. Williams Jr.
by ﾠ, Atty.

UNITED STATES PATENT OFFICE.

SAMUEL B. WILLIAMS, JR., OF BROOKLYN, NEW YORK, ASSIGNOR, BY MESNE ASSIGNMENTS, TO WESTERN ELECTRIC COMPANY, INCORPORATED, A CORPORATION OF NEW YORK.

TELEPHONE-EXCHANGE SYSTEM.

1,203,671.      Specification of Letters Patent.      Patented Nov. 7, 1916.

Application filed September 23, 1915. Serial No. 52,278.

*To all whom it may concern:*

Be it known that I, SAMUEL B. WILLIAMS, Jr., a citizen of the United States, residing at Brooklyn, in the county of Kings and State of New York, have invented certain new and useful Improvements in Telephone-Exchange Systems, of which the following is a full, clear, concise, and exact description.

This invention relates to telephone exchange systems employing machine switching. In such systems, the selectors are given a primary movement under control of a sender to pick out the desired group of trunks, and a secondary hunting movement during which the selector brushes wipe over the terminals of the selected group in search of an idle trunk therein.

This invention relates to that type of system wherein the secondary stepping magnets of the selectors are driven over the trunk terminals by impulses from a constantly operating interrupting machine. It sometimes happens that the secondary stepping magnet of the selector is placed in circuit with the interrupting machine when the brushes of such machine have already engaged the metallic portion of the commutator. In such case, the first impulse received by the secondary stepping magnet is not a full one.

It is the object of this invention to provide a circuit arrangement wherein the first impulse delivered by the interrupting machine to any secondary magnet will always be of the required duration, thus insuring that the selector brushes will land accurately on the terminals of the first trunk upon the receipt of such impulse. In such systems, the stepping relay of the selector, as it is being operated by the sender to transmit impulses to the primary stepping magnet, also sends impulses to a pair of slow relays, one of the relays receiving its impulses from the front contact of the stepping relay and maintaining open the release circuit of the selector, and the other from the back contact of the stepping relay. The latter slow relay is adapted to maintain energized an electromagnet which holds open the connection between the secondary stepping magnet and the interrupting machine while the primary magnet is operating, and upon the restoration of the sender and the consequent maintained energization of the stepping relay, this slow relay becomes deënergized and deenergizes said electromagnet, which in falling back connects the interrupting machine to the secondary stepping magnet.

In the circuit arrangement of this invention, the electromagnet referred to is provided with a locking circuit which includes an armature and front contact of said electromagnet, such circuit being controlled by the interrupting machine. Thus if, when the slow relay referred to retracts its armature upon the restoration of the sender the brushes of the interrupting machine are on the metallic portion of the commutator, the said electromagnet will not become deënergized to close the connection between the secondary stepping magnet and the interrupting machine, but such electromagnet will be maintained energized by a circuit leading through its own armature and front contact and the interrupting machine until the brushes engage the insulated portion of the commutator. This electromagnet then becomes deënergized and at its armature and back contact places the secondary stepping magnet in operative relation to the interrupting machine. Thus, when the brushes next engage the metallic portion of the commutator, the secondary stepping magnet will receive the full impulse.

The invention will be more readily understood when described with reference to the accompanying drawing which shows only so much of a telephone exchange system as is necessary for an understanding of the invention.

The calling substation A may be extended by means of a line finder, the brushes 10, 11 and terminals 12, 13 only of which are shown, since such structures are well known in the art. This line finder is set in motion by the removal of the receiver at the calling substation A, and when the brushes 10, 11 thereof come to rest upon the multiples 12, 13 of calling substation A, the stepping relay 12′ of the selector is energized over the following circuit: free pole of battery, left winding of relay 12′, side switch arm 2 and its first contact, conductor 13′, finder brush 11, finder terminal 13, through the telephonic apparatus at substation A, finder terminal 12, finder brush 10, conductor 14, side switch arm 1 and its first contact, right winding of relay 12′ to ground. Relay 12′, by attracting its armature, energizes a slow relay 15, which at its armature and back contact interposes a break in the circuit of release magnet 16, and at its armature and front contact prepares the circuit of primary stepping magnet 17. The subscriber at substation A now operates his sender S, which in restoring, interrupts the line circuit a number of times, corresponding to the digit of the wanted line with which this particular selector is concerned. Upon each retraction of the armature of stepping relay 12′, an impulse is sent to the primary stepping magnet 17 over the following circuit: free pole of battery, side switch arm 6 and its first contact, magnet 17, armature and front contact of slow relay 15, armature and back contact of stepping relay 12′ to ground. The relay 15 being slow, maintains its armature attracted during the interruption of the circuit of relay 12′ by the sender. Upon the first retraction of the armature of relay 12′, the following circuit is closed for a slow relay 19: free pole of battery, relay 19, armature and front contact of slow relay 15, armature and back contact of relay 12′ to ground. This relay being slow, is maintained energized while relay 12′ is operating. Relay 19, at its armature and front contact, energizes a magnet 20, which is the escapement magnet of the side switch and which, in the well-known manner, releases the side switch from position 1 to position 2 upon its deënergization. When the sender S restores and maintains stepping relay 12′ energized, relay 19, after an interval, releases its armature, thus opening the circuit of escapement magnet 20, which in deënergizing, releases the side switch into position 2 to initiate the trunk hunting operation. However, if at the instant slow relay 19 deënergizes and opens the circuit of escapement magnet 20 at its armature and front contact the brush 21 of interrupting machine 40 is in contact with the metallic portion 23 of commutator 39 of such machine, a relay 22 is energized, and at its armature and front contact connects ground to the armature of escapement magnet 20. Thus, the escapement magnet holds its armature attracted and prevents the side switch from escaping to position 2 until the brush 21 of the interrupter passes off the metallic portion 23 and passes into engagement with the insulated portion 38, when the relay 22 will fall off, in turn causing the deënergization of the escapement magnet 20, which in retracting its armature, releases the side switch into position 2. The escapement magnet, by closing its armature and back contact, prepares the circuit of the secondary stepping magnet 24. Now, when the brush 21 next passes into engagement with the metallic portion 23 of the commutator 39, the relay 22 will become energized and send a full impulse to the secondary stepping magnet 24 by way of its armature and front contact, the armature and back contact of escapement magnet 20, magnet 24 and side switch arm 6 and its second contact. In position 2, escapement magnet 20 is connected by side switch arm 3 to test brush 25 of the selector. Idle trunks are those upon whose test multiples 26 ground is present. The escapement magnet 20 is so constructed that it releases the side-switch from position 2 to position 3 upon its energization. Consequently, when the brushes 25, 27, 28 engage the terminals 26, 29, 30, respectively, of an idle trunk, the escapement magnet 20 is energized and immediately releases the side switch into position 3, and at its armature and back contact opens the circuit of secondary stepping magnet 24, thus bringing the selector to rest upon such terminals. Side switch arm 6, in moving out of position 2, disconnects battery from magnet 24. Side switch arm 7 disconnects the interrupting machine 40 from relay 22. Side switch arms 1 and 2 disconnect stepping relay 12′ from conductors 13′ and 14, and connect such conductors through to conductors 31 and 32 terminating in the brushes 27, 28 of the selector. When side switch arms 1 and 2 reach their third contacts, the stepping relay at the succeeding selector corresponding to 12′ becomes energized, and removes ground from test conductor 33. The release magnet 16 is so wound that although the side switch arm 3 reaches its third contact before such ground is removed, the interval during which ground is present on conductor 33, before the said relay energizes, is too short to permit the magnet 16 to become sufficiently energized to withdraw the holding pawls from the selector brush shaft. Side switch arm 4, moving from positions 2 to 3, removes the control of the release of the selector from the calling party, and the engagement of side switch arm 3 with its third contact connects the release magnet 16 through to the test brush 25. The subscriber at substation A now operates his sender S to set the succeeding selectors and connector. The connector may be of any well-known type and is not therefore shown or described.

When the parties to the connection have finished their conversation, the replacement of the receivers will cause a ground to be placed upon test conductor 33 in any well-known manner. The placing of this ground upon conductor 33 closes a circuit leading from the release magnet 16 over primary off-normal contact 34, side switch arm 3 and its third contact, test brush 25 and test terminal 26, and operates the release magnet which withdraws the holding pawls of the selector shaft, thus restoring the same. When the selector completely restores, primary off-normal contact 34 opens and deënergizes the release magnet 16. The release magnet, in attracting its armature, restores the side switch in the well-known manner. The finder is also restored by the placing of this ground upon conductor 33, conductor 35 leading to the release magnet of such finder. A condenser 36, connected through a resistance 37 to the free pole of the battery, is bridged around the primary magnet 17 by means of side switch arm 5 in position 1, and in position 2 is bridged around the secondary magnet 24 to absorb the spark at the contacts of these magnets. The attraction of the armature of release magnet 16, upon the release of the switch, bridges this condenser around the release magnet 16.

While the invention is shown as embodied in a selector switch, it is apparent that it is equally applicable to line finders or to what are known as rotary connectors or trunk hunting connectors, or in fact to any automatic switch driven by a stepping magnet from an interrupting machine.

What is claimed is:

1. In a telephone exchange system, the combination with telephone lines, automatic switches to which said lines are multiplied, primary and secondary stepping magnets for said switches, means controlled by said lines for operating said primary magnets, an interrupting machine adapted to operate said secondary magnets, a control magnet for each switch and a circuit therefor adapted to maintain the same energized while the primary magnet of such switch is operating and to be opened upon the conclusion of the operation of said magnet, of a locking circuit for said control magnet including an armature and front contact thereof and controlled by said interrupting machine, and a stepping circuit controlled by said machine and including the associated secondary magnet and the armature and back contact of said control magnet.

2. In a telephone exchange system, the combination with telephone lines, automatic switches to which said lines are multipled, primary and secondary stepping magnets for said switches, means controlled by said lines for operating said primary magnets, an interrupting machine adapted to operate said secondary magnets, a side switch for each of said automatic switches, an escapement magnet for said side switch, a circuit adapted to maintain the same energized while said primary magnet is operating and to be opened upon the conclusion of the operation of said magnet, of a locking circuit including an armature and front contact of said escapement magnet and controlled by said interrupting machine, and a stepping circuit controlled by said machine and including the associated secondary magnet and the armature and back contact of said escapement magnet.

3. In a telephone exchange system, the combination with telephone lines, automatic selector switches to which said lines are multiplied, primary and secondary stepping magnets for each of said switches, a sender adapted to operate said primary magnets, an interrupting machine adapted to operate said secondary magnets, a side switch for each of said automatic switches, an escapement magnet for each side switch, a circuit therefor adapted to maintain the same energized during the operation of said primary magnet and to be opened upon the conclusion of the operation of said magnet, said magnet upon its deënergization advancing the side switch, of a locking circuit for said escapement magnet controlled by said interrupter, and a stepping circuit controlled by said machine and including the associated secondary magnet and the armature and back contact of said escapement magnet.

In witness whereof, I hereunto subscribe my name this 21st day of September, A. D. 1915.

SAMUEL B. WILLIAMS, Jr.